United States Patent [19]

Heinrich et al.

[11] 4,035,143

[45] July 12, 1977

[54] WATER-INSOLUBLE AZO DYESTUFFS

[75] Inventors: Ernst Heinrich, Frankfurt am Main; Joachim Ribka, Offenbach am Main; Joachim Valentin, Frankfurt am Main, all of Germany

[73] Assignee: Cassella Farbwerke Mainkur Aktiengesellschaft, Germany

[21] Appl. No.: 631,170

[22] Filed: Nov. 11, 1975

Related U.S. Application Data

[60] Continuation-in-part of Ser. No. 498,461, Aug. 19, 1974, abandoned, which is a division of Ser. No. 410,804, Oct. 29, 1973, abandoned.

[30] Foreign Application Priority Data

Nov. 4, 1972   Germany .......................... 2254017

[51] Int. Cl.² .................... D06P 3/00; D06P 5/00; C07C 107/06; C09B 29/14
[52] U.S. Cl. ............................... 8/4; 8/41 B; 8/41 C; 8/178 R; 8/179; 260/205; 260/207; 260/207.1
[58] Field of Search ............... 8/4, 41, 41 B, 41 C; 260/207, 207.1,

[56] References Cited

U.S. PATENT DOCUMENTS

| | | | |
|---|---|---|---|
| 2,277,230 | 3/1942 | Heinrich | 260/205 |
| 3,268,507 | 8/1966 | Kruckenberg | 260/207 |
| 3,406,165 | 10/1968 | Kruckenberg | 260/207.1 |
| 3,544,550 | 12/1970 | Anderton et al. | 260/207.1 |
| 3,553,190 | 1/1971 | Anderton et al. | 260/207 |
| 3,558,593 | 1/1971 | Lindner et al. | 260/207.1 |
| 3,637,651 | 1/1972 | Baron et al. | 260/207 |
| 3,766,164 | 10/1973 | Hahnle | 260/205 |

FOREIGN PATENT DOCUMENTS

| | | |
|---|---|---|
| 1,809,920 | 6/1970 | Germany |
| 1,184,825 | 3/1970 | United Kingdom |

*Primary Examiner*—Harry Wong, Jr.
*Assistant Examiner*—A. L. Clingman
*Attorney, Agent, or Firm*—Connolly and Hutz

[57]   ABSTRACT

A water-insoluble azo dyestuff of the formula

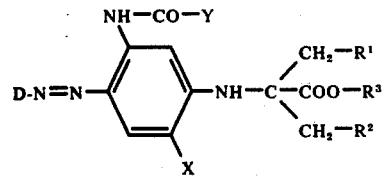

wherein D is an optionally substituted aromatic or heteroaromatic radical free of ionic groups; X is hydrogen or optionally substituted alkoxy; Y is hydrogen, optionally substituted alkyl, alkenyl, cycloalkyl, phenyl, hetaryl, alkoxy or phenoxy or —NHR⁴ wherein R⁴ is alkyl, alkenyl, cycloalkyl, aralkyl or aryl; R¹ and R² are hydrogen or alkyl and R³ is optionally substituted alkyl and its utility in the dyeing and printing of hydrophobic synthetic fibers and films such as polyesters.

7 Claims, No Drawings

WATER-INSOLUBLE AZO DYESTUFFS

CROSS-REFERENCE TO RELATED APPLICATIONS

This application is a continuation-in-part of application Ser. No. 498,461 filed Aug. 19, 1974, now abandoned, which in turn is a division of parent application Ser. No. 410,804, filed Oct. 29, 1973, now abandoned.

The present invention relates to water-insoluble azo dyestuffs of the formula

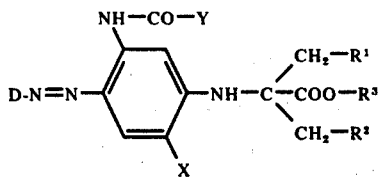

wherein

D is phenyl, naphthyl, thiazolyl, benzothiazolyl, benzisothiazolyl or triazolyl or one of said radicals substituted with at least one member selected from the group consisting of alkyl having 1 to 4 carbon atoms, alkoxy having 1 to 4 carbon atoms, nitro, cyano, alkylsulfonyl having 1 to 4 carbon atoms, alkylthio having 1 to 4 carbon atoms, chlorine, bromine and phenylazo;

X is hydrogen, alkoxy having 1 to 6 carbon atoms or said alkoxy substituted with a member selected from the group consisting of hydroxy, alkoxy having 1 to 4 carbon atoms, phenoxy and alkyl substituted phenyl having 1 to 4 carbon atoms in said alkyl moiety;

Y is hydrogen; alkyl having 1 to 5 carbon atoms; alkenyl having 2 to 5 carbon atoms; said alkyl or alkenyl substituted by halogen, hydroxy, alkoxy having 1 to 4 carbon atoms, phenoxy, alkyl substituted phenoxy having 1 to 4 carbon atoms in said alkyl moiety, phenyl or alkyl substituted phenyl having 1 to 4 carbon atoms in said alkyl moiety; cycloalkyl having from 3 to 8 carbon atoms; said cycloalkyl substituted with at least one member selected from the group consisting of halogen, cyano, alkyl having 1 to 3 carbon atoms and alkoxy having 1 to 3 carbon atoms; phenyl; phenyl substituted with at least one member selected from the group consisting of halogen, cyano, alkyl having 1 to 3 carbon atoms and alkoxy having 1 to 3 carbon atoms; pyridyl; thiazolyl; benzothiazolyl; imidazolyl; benzimidazolyl; thienyl; furyl; pyrrolyl; alkoxy having 1 to 6 carbon atoms; said alkoxy substituted with a member selected from the group consisting of hydroxy, alkoxy having 1 to 4 carbon atoms, phenoxy and alkyl substituted phenoxy wherein said alkyl moiety has from 1 to 4 carbon atoms; phenoxy; alkoxy substituted phenoxy having 1 to 4 carbon atoms in said alkoxy moiety or —NHR$^4$ wherein R$^4$ is alkyl having 1 to 6 carbon atoms, alkenyl having 2 to 6 carbon atoms, cycloalkyl having 3 to 8 carbon atoms, benzyl, phenethyl, phenyl or said cycloalkyl or phenyl substituted by at least one member selected from the group consisting of halogen, cyano, alkyl having 1 to 3 carbon atoms and alkoxy having 1 to 3 carbon atoms;

R$^1$ and R$^2$ are hydrogen or alkyl having 1 to 3 carbon atoms and

R$^3$ is alkyl having 1 to 5 carbon atoms or said alkyl substituted by a member selected from the group consisting of halogen, alkoxy having 1 to 2 carbon atoms, alkoxy substituted alkoxy wherein each alkoxy group has 1 to 2 carbon atoms, phenoxy, phenoxy substituted alkoxy having 1 to 2 carbon atoms in said alkoxy moiety and phenyl.

Preferably, D is phenyl or phenyl substituted with at least one member selected from the group consisting of alkyl having 1 to 4 carbon atoms, alkoxy having 1 to 4 carbon atoms, nitro, cyano, alkylsulfonyl having 1 to 4 carbon atoms, alkylthio having 1 to 4 carbon atoms, chlorine, bromine and phenylazo. For multiple substitution of D which is preferably phenyl, particularly preferred substituents include chlorine, bromine, cyano, nitro, alkyl having 1 to 4 carbon atoms and alkylsulfonyl having 1 to 4 carbon atoms. Particularly preferred substituents for D include methyl and ethyl, methoxy, ethoxy, nitro, cyano, methylsulfonyl, ethylsulfonyl, chlorine, bromine and phenylazo.

When X or Y is alkoxy or substituted alkoxy, it is preferred that the alkoxy group contain 1 to 4 carbon atoms. Moreover in the case of substituted alkoxy groups for X and Y, it is preferred that said substituent be positioned on the terminal carbon atom of the alkoxy moiety.

When Y is alkyl or substituted alkyl, the alkyl moiety preferably contains 1 to 3 carbon atoms. When Y is alkenyl or substituted alkenyl, the alkenyl moiety preferably contains 2 to 3 carbon atoms. When Y is alkyl or alkenyl substituted with halogen, chlorine is preferred.

When Y is alkoxy substituted phenoxy, the preferred alkoxy radicals are methoxy and ethoxy.

When R$^3$ is alkyl substituted with halogen, chlorine is preferred.

When R$^4$ is alkyl, it preferably contains 1 to 4 carbon atoms and when it is alkenyl, is preferably contains 2 to 4 carbon atoms.

When R$^4$ and Y are cycloalkyl, each is preferably cyclohexyl.

When Y, R$^3$ or R$^4$ is aryl, phenyl is the preferred radical and when R$^4$ is aralkyl, it is preferably phenethyl or benzyl.

When Y, R$^3$ and R$^4$ are halogen substituted cycloalkyl or halogen substituted phenyl, chlorine and bromine substituents are preferred.

The dyestuffs of the present invention may be prepared by coupling a diazonium compound of an aromatic or heteroaromatic amine of the formula $$D - NH_2 \qquad \qquad II$$

with a coupling component of the formula

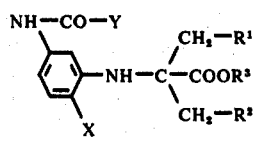

wherein D, X, Y, R$^1$, R$^2$ and R$^3$ are as aforesaid.

The diazonium compounds are prepared from the amines of formula II in known manner by diazotization. Normally, diazotization takes place in an aqueous medium or in an inorganic or organic acid at temperature of 0° to 10° C. in the presence of nitrous acid. Sodium nitrite, for example, and an acid such as sulfuric acid or nitrososulfuric acid are employed in the standard fashion for the preparation of nitrous acid. The diazo solution which is obtained is combined with a solution of the coupling component at temperatures of 0° to 25° C. and preferably 0° to 10° C. The coupling component may be dissolved in a suitable solvent such as methanol, dimethylformamide, etc. However, the coupling component is normally dissolved in water acidified with sulfuric acid. In some instances, it may be helpful to buffer the pH value during coupling by, for example, the addition of sodium acetate. The coupling is completed after several hours and the dyestuff may be recovered and dried.

Typical examples of aromatic and heteroaromatic amines of formula II include 2-, 3- and 4-nitroaniline, 2-methyl-4-nitroaniline, 2-, 3- and 4-cyanoaniline, 2-chloro-4-nitroaniline, 2-bromo-4-nitroaniline, 2-nitro-4-chloraniline, 2-nitro-4-bromoaniline, 2,4-dinitroaniline, 4-nitro-2-cyanoaniline, 4-methyl and 4-ethyl sulfonylaniline, 4-nitro-2-methylsulfonylaniline, 4-nitro-2,6-dichloraniline, 4-nitro-2,6-dibromoaniline, 2,4-dinitro-6-chloroaniline, 2,4-dinitro-6-bromoaniline, 4-nitro-2-cyano-6-bromoaniline, 2,4-dinitro-6-cyanoaniline, 4-nitro-2,6-dicyanoaniline, 4-nitro-2-cyano-6-methylsulfonylaniline, 2,4-dinitro-6-methyl- or butylsulfonyl aniline, 2,4-dinitro-6-methylthioether or -6-n-butylthioether aniline, 4-nitro-2-methylsulfonyl-6-bromoaniline, 2,4-dinitro-6-methoxyaniline, 4-nitro-2-cyano-6-ethyoxyaniline, 4-nitro-2-bromo-6-methoxyaniline, 5-nitro-2-aminothiazol, 2-amino-4-methyl-5-nitrothiazol, 2-aminobenzothiazol, 6-nitro-2-amino-benzothiazol, 3-amino-5-nitro-2,1-benzoisothiazol, 3-amino-5-nitro-7-chloro- or bromo-2,1-benzoisothiazol, 3-amino-5-$\beta$-hydroxypropyl-1,2,4-triazol, 4-aminoazobenzene, 4'-nitro-4-aminoazobenzene and 2,3'-dimethyl-4-aminoazobenzene.

Typical examples of substitutent X is coupling component III and consequently also in dyestuff I include hydrogen, methoxy, ethoxy, 2-hydroxyethoxy, 2-ethoxyethoxy, 2-phenoxyethoxy, 2-(2'-methylphenoxyethoxy), 2-(4'-methylphenoxyethoxy), n-propoxy, isopropoxy and n-butoxy. Typical examples of the substituent Y in coupling component III and consequently also in dyestuff I include hydrogen, methyl, chloromethyl, methoxymethyl, ethoxymethyl, n-butoxymethyl, phenoxymethyl, 4-chlorophenoxymethyl, 4-bromophenoxymethyl, phenylmethyl, ethyl, 2-hydroxyethyl, 2-methoxyethyl, 2-ethoxyethyl, 2-phenoxyethyl, 2-(2'-methoxyphenoxy)-ethyl, 2-(4'-methoxyphenoxy)-ethyl, n-propyl, isopropyl, 3-hydroxy- n-propyl, isobutyl, n-pentyl, allyl, 2-methylallyl, 2-phenylvinyl, cyclohexyl, methoxy, ethoxy, phenoxy, 4-ethoxyphenoxy, ethylamino, allylamino, cyclohexylamino, phenylamino, 2-furyl, 3-furyl, 2-thienyl, 3-thienyl, 2-pyridyl, 3-pyridyl and 4-pyridyl.

Typical $R^1$ and $R^2$ substituents include hydrogen, methyl, ethyl and n-propyl.

Typical $R^3$ substituents include methyl, phenylmethyl, ethyl, 2-chloroethyl, 2-methoxyethyl, 2-ethoxyethyl, 2-(2'-ethoxyethoxy)-ethyl, 2-phenoxyethyl, 2-(2'-phenoxyethoxy)-ethyl, 2-phenylethyl, n-propyl, isopropyl, n-butyl, isobutyl, tert.-butyl and isopentyl.

Preparation of the dyestuffs of the present invention may be accomplished by converting the novel dyestuff of the formula

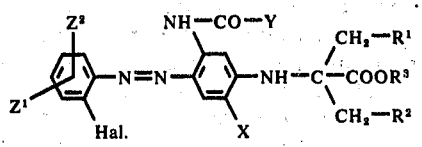  IV in accordance with the procedure of German Published application Nos. 1,809,921 and 1,809,920, 2,023,785 and British Pat. No. 1,184,825 involving a nucleophilic exchange reaction. In formula IV, $Z_1$ and $Z_2$ are the same or different and selected from the group consisting of chlorine, bromine, nitro, cyano, $-SO_2-R^5$ and $-OR^5$, Hal is halogen, preferably chlorine or bromine, X, Y, $R^1$, $R^2$ and $R^3$ are as aforesaid and $R^5$ is alkyl having 1 to 6 carbon atoms. Treatment of compound IV in accordance with the aforesaid German and British Patents exchanges Hal with nitro to obtain a compound of the formula

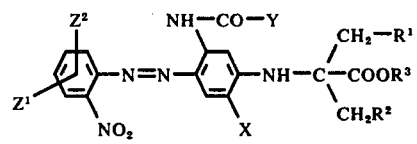  V

Treatment of compound IV in accordance with the aforesaid German and British Patents exchanges Hal with cyano to obtain a compound of the formula

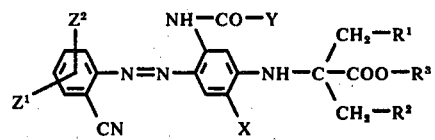  VI

Treatment of compound IV in accordance with the aforesaid German and British Patents exchanges Hal with cyano to obtain a compound of the formula

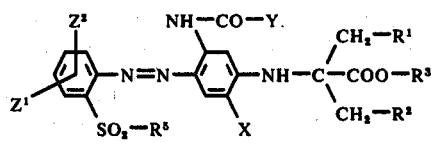  VII

Treatment of compound IV in accordance with the aforesaid German and British Patents exchanges Hal with $-SR^5$ to obtain a compound of the formula

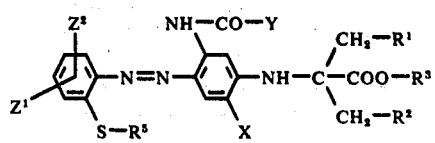  VIII

The exchange reactions are carried out in an inert organic solvent, preferably a dipolar aprotic solvent such as N-methylpyrrolidone, pyridine, dimethylformamide or dimethyl sulfoxide. Reaction temperatures are generally between 20° and 150° C. The nucleophilic agent ($NO_2^-$, $CN^-$, $^-SO_2-R^5$ and $^-S-R^5$) may be introduced into the reaction in the form of an alkali metal or alkali earth metal compound such as $NaNO_2$, $NaSO_2R^5$ and NaCN. Preferably, however, it is introduced as a cuprous compound or in the presence of another cuprous compound such as CuCl, CUBr, CuI or $Cu_2O$.

Coupling components needed for the preparation of the dyestuffs of this invention may be prepared in accordance with known processes. For example, coupling component III may be obtained by reacting an aniline derivative of formula IX in glacial acetic acid with a ketone of formula X and KCN to obtain nitriles of the formula XI (see Walter and Hübner, J. Pr. Chem., 93, 123). The foregoing reaction is represented by the following equation

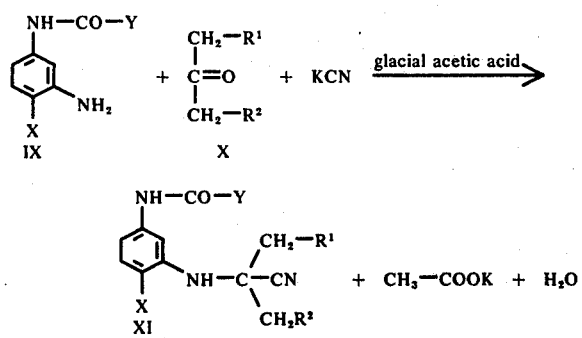

The nitriles of formula XI may be reacted in the presence of mineral acids, preferably hydrogen chloride or hydrogen bromide with alcohols of the formula $R^3OH$ in accordance with the following reaction equations

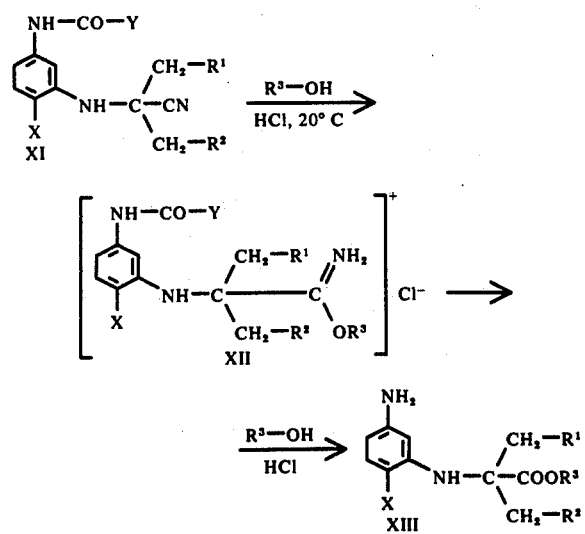

The first of the foregoing equations yields the salt of the corresponding imidacid ester of formula XII. In the second step which is carried out between 20° C. and the boiling point of the alcohol $R^3$—OH which is employed, the ester of formula XIII results. Generally, saponification of —NH—CO—Y of compound XI occurs to form a $NH_2$ group. The reaction of ester XIII with acylation agents which introduce the acyl radical —CO—Y, such as carboxylic acid anhydride of the formula $O(COY)_2$, carboxylic acid halides of the formula HalCOY or chloroformic acid esters if Y is an alkoxy or phenoxy group, obtains the desired ester of formula III in accordance with the equation

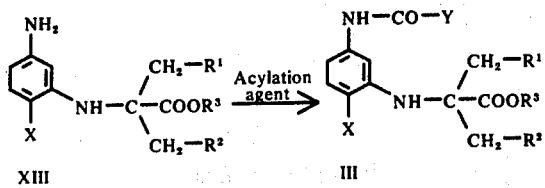

For the preparation of coupling component III, one may also react an α-halogen-carboxylic acid halide of formula XIV, especially the α-bromocarboxylic acid bromide, with alcohol of formula XV to obtain the α-halogen ester XVI in accordance with the reaction

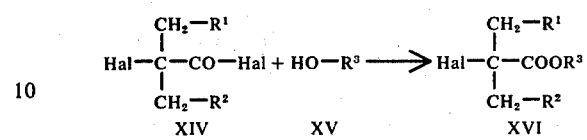

The product of formula XVI is then condensed with an aniline derivative of formula XVII to obtain coupling component III in accordance with the equation

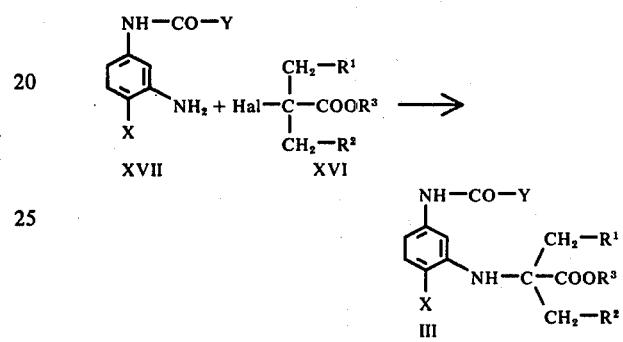

A particularly preferred class of dyestuffs of the present invention include those of formula I wherein D is phenyl or phenyl substituted with at least one member selected from the group consisting of alkoxy having 1 to 2 carbon atoms, nitro, cyano, alkylsulfonyl having 1 to 4 carbon atoms, chlorine, bromine and phenylazo;

X is hydrogen, alkoxy having 1 to 6 carbon atoms or said alkoxy substituted with a member selected from the group consisting of hydroxy, alkoxy having 1 to 4 carbon atoms, phenoxy and alkyl substituted phenoxy having from 1 to 4 carbon atoms in said alkyl moiety;

Y is alkyl having 1 to 5 carbon atoms or said alkyl substituted by halogen, hydroxy, alkoxy having 1 to 4 carbon atoms, phenoxy, alkyl substituted phenoxy having 1 to 2 carbon atoms in said alkyl moiety, phenyl or alkyl substituted phenyl having 1 to 2 carbon atoms in said alkyl moiety; phenyl; phenyl substituted with at least one member selected from the group consisting of halogen, alkyl having 1 to 2 carbon atoms and alkoxy having 1 to 2 carbon atoms; pyridyl; furyl; alkoxy having 1 to 6 carbon atoms; said alkoxy substituted with a member selected from the group consisting of alkoxy having 1 to 2 carbon atoms; phenoxy; or —$NHR^4$ wherein $R^4$ is alkyl having 1 to 6 carbon atoms; alkenyl having 2 to 6 carbon atoms or phenyl;

$R^1$ and $R^2$ are hydrogen or alkyl having 1 to 3 carbon atoms and $R^3$ is alkyl having 1 to 5 carbon atoms or said alkyl substituted by a member selected from the group consisting of halogen, alkoxy having 1 to 2 carbon atoms, alkoxy substituted alkoxy wherein each alkoxy group has 1 to 2 carbon atoms, phenoxy, phenoxy substituted alkoxy having 1 to 2 carbon atoms in said alkoxy moiety and phenyl.

An especially preferred group of dyestuffs of the present invention include those of formula I wherein D is selected from the group consisting of 2,4-dinitro-6-chlorophenyl, 2,4-dinitro-6-bromophenyl and 2-cyano-4-nitro-6-bromophenyl;

X is hydrogen, methoxy or ethoxy;

Y is methyl;

$R^1$ and $R^2$ are hydrogen and $R^3$ is ethyl, n-butyl, sec.-butyl, isobutyl, 2-methoxyethyl, 2-ethoxyethyl, 2-(2'-methoxyethoxy)-ethyl or 2-(2'-ethoxyethoxy)-ethyl.

The dyestuffs of the present invention are useful individually or in admixture with each other or with other dispersion dyestuffs for the dyeing and printing of hydrophobic synthetic fabrics and films. Such fabrics and films include those based on cellulose-2½-acetate, cellulose triacetate, polyamides and polyesters, especially polyethylene glycol terephthalate. The fibers may be in the form of yarns and woven and knitted textile materials. Using the customary dyeing and printing processes, there are obtained colorfast orange, red, violet and blue dyes and prints with good coloristic properties, such as excellent fastness properties, particularly good fastness to light and dry-heat pleating and setting as well as very good wet fastness properties, such as fastness to washing at 95° C., to peroxide washing, chlorine washing, a good resistance to perspiration and treatments in alkaline media, resistance to solvents, drycleaning, fastness to soda boiling, peroxide bleaching and hypochlorite, as well as good fastness properties to combustion gases and other waste-gases. The dyestuffs of the present invention possess a great coloring strength and good build-up capacity. They have a low sensitivity to changes and variations of the dyeing and printing conditions, such as changes of the temperature and changes of the pH-value. Thus, fabrics and films can be dyed or printed with these dyes perfectly, for instance, in a wide pH range, in particular within a pH range of between 2 and 8. Dyeing of the stated fibers and films may be carried out in aqueous suspensions, in the presence of carriers, if desired, at temperatures between 80° and 140° C. or in accordance with the so-called thermofixing process at temperatures of about 180° to 230° C. Printing of the aforesaid materials may be carried out in the customary fashion and in the optional presence of a carrier at temperatures between 80° and 230° C. The good pH-resistance is of special advantage in the dyeing and printing of mixed materials, such as polyester and cellulose mixed fabrics, with dye compositions containing a reactive dyestuff. Customarily, such mixed materials are padded in the alkaline range with such dye liquors as contain disperse and reactive dyestuffs and subsequently are submitted to a thermofixing process.

The present invention is illustrated by the following example, temperatures therein being in °C. and percentages being percentage by weight.

EXAMPLE 1 a. A composition of 16.7 parts by weight 42% nitrosyl sulfuric acid and 35 parts by weight concentrated sulfuric acid is cooled to 0° to 5°. Then during vigorous agitation, 8.6 parts by weight 2-chloro-4-nitroaniline are introduced and subsequently stirred 1 hour at 0° to 10°. The mixture is then poured over ice, and the aqueous diazo solution mixed with 0.5 parts by weight amidosulfonic acid for the removal of excess nitrous acid. Thereafter, at 0° to 10°, the diazo solution is allowed to run into a solution of 13.2 parts by weight α-(3-acetylaminophenyl)-aminoisobutyric acid ethyl ester in 200 parts by weight of 5% sulfuric acid. Coupling proceeds very quickly and is completed after 1 to 2 hours. The resulting dyestuff is recovered, washed neutral with water and dried.

The α-(3-acetylaminophenyl)-aminoisobutyric acid ethyl ester necessary as the coupling component may be prepared by agitating 200 parts by weight glacial acetic acid, 93 parts by weight acetyl-m-phenylene diamine hydrochloride and 41 parts by weight sodium acetate one hour at 20° to 25°. Then 58 parts by weight acetone are added and into this mixture is added dropwise a solution of 50 parts by weight potassium cyanide in 75 parts by weight water for a period of 4 hours at 20° to 25°. Then the mixture is agitated 20 hours at 20° to 25°. The crystallized α-(3-acetylaminophenyl)-aminoisobutyric acid nitrile is recovered and washed neutral with water.

There are suspended 21.7 parts by weight α-(3-acetylaminophenyl)-aminoisobutyric acid nitrile in 200 parts by weight ethanol. During stirring at 20° to 25°, a rapid stream of dry hydrochloric acid gas is introduced into the suspension until the composition is saturated with hydrochloric acid. Then the rate of hydrochloric acid supply is reduced and the mixture is further agitated for 48 hours at 20° to 25°. After this, α-(3-acetylaminophenyl)-aminoisobutyric acid nitrile is no longer detectable chromatographically. The supply of hydrochloric acid is interrupted and the composition is cooked for another 8 hours at reflux. Thereafter, the reaction mixture is heated to 40° to 50° in vacuum, the volatile constituents being distilled off. The distillation residue is mixed with 30 parts by weight acetic anhydride at 20° to 25° for 16 hours. Thereafter the acetylation mixture is poured into 200 parts by weight water and agitated 3 to 4 hours at 20° to 30°. The organic phase consists mainly of α-(3-acetylaminophenyl)-aminoisobutyric acid ethyl ester. It is separated and may be used in this form directly for coupling. The product may also be purified by distillation under high vacuum.

b. The thusly obtained, finely dispersed dyestuff (1.0 part by weight) of the formula

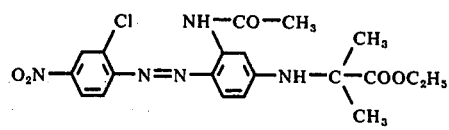

is stirred into 2000 parts by weight water. It is standardized with acetic acid to a pH of 5 to 6 and mixed with 4 parts by weight ammonium sulfate and 2 parts by weight of a commercial dispersing agent which is a naphthalene sulfonic acid condensate with formaldehyde.

Into the thusly obtained dye bath are introduced 100 parts by weight of a polyester material based on polyethylene glycol terephthalate and it is dyed 1½ hours at 120° to 130°. After a subsequent washing, reductive after-treatment with a 0.2% alkaline sodium dithionite solution for 15 minutes at 60° to 70°, washing and drying, there is obtained a colorfast orange dyeing with very good fastness properties, particularly very good light fastness.

EXAMPLE 2 a. Using the procedure of Example 1 (a), 8.6 parts by weight 2-chloro-4-nitroaniline are diazotized. The diazonium compound is coupled with a solution of 14.7 parts by weight α-(3-acetylamino-6-methoxyphenyl)-aminoisobutyric acid ethyl ester in 300 parts by weight of 5% sulfuric acid. Coupling is complete after 1 to 2 hours. The resulting dyestuff is recovered, washed neutral with water and dried. The α-(3-acetylamino-6-methoxyphenyl)-aminoisobutyric acid ethyl ester, needed as the coupling component, is obtained by the reaction of isobutyric acid with bromine and red phosphorus to the α-bromoisobutyric acid bromide, the introduction of this intermediate product into ethanol, the purification of the resulting α-bromoisobutyric acid ethyl ester by vacuum distillation and condensation with 4-acetylamino-2-aminoanisole in the presence of an acid-binding agent.

b. Thirty parts by weight of the dyestuff obtained in accordance with Example 2 (a) of the formula

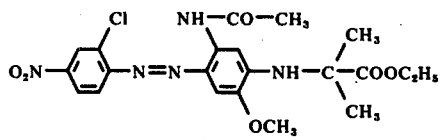

are incorporated in finely ground form into a printing paste, which contains 45 parts by weight carob bean flour, 6 parts by weight of the sodium salt of 3-nitrobenzene sulfonic acid and 3 parts by weight citric acid per 1000 parts by weight of paste. After printing with this paste, drying and fixing in the thermofixing frame for 45 seconds at 215°, washing and finishing in accordance with Example 1 (b), paragraph 2, a bluish red print it obtained having very good fastness properties. In the printing of triacetate material, the dyestuff produces a red print having very good coloristic properties when it is used in the form of the above printing paste, and the printed material is steamed 10 minutes at 1.5 atmospheres gauge pressure after drying, washed, saponified, again washed and dried.

EXAMPLE 3 a. In accordance with Example 1 (a), paragraph 1, 13.1 parts by weight of 2,4-dinitro-6-bromoaniline are diazotized and coupled with 17.6 parts by weight α-(3-γ-hydroxybutyrylamino-6-ethoxyphenyl)-aminoisobutyric acid ethyl ester. Coupling is quickly completed. The resulting dyestuff is recovered, washed neutral with water and dried.

The coupling component necessary for the preparation of this dyestuff may be obtained by reacting 2-nitro-4-aminophenetole with γ-butyrolactone to 2-nitro-4-γ-hydroxy-butyryl-aminophenetole, reducing the nitro group to the amino group and condensing the obtained intermediate product with α-bromoisobutyric acid ethyl ester as already described in Example 2.

b. A fabric of polyethylene glycol terephthalate is padded at 30° on a pad with a dye liquor containing 30 parts by weight of the finely divided dyestuff of the formula

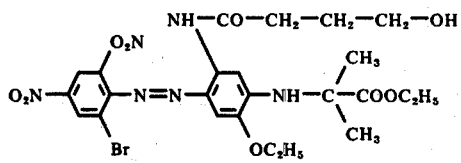

1.0 parts by weight polyacrylamide having a K-value of 120 and 0.5 parts by weight of a polyglycolether of oleyl alcohol and 968.5 parts by weight water. After drying, it is fixed 60 seconds at 210° in the thermofixing frame. After a subsequent washing and finishing, as described in Example 1 (b), paragraph 2, there is obtained a violet dyeing of very good fastness properties.

In accordance with the procedures of Examples 1–3, additional dyestuffs of formula I were synthesized and used in the dyeing or printing of polyester materials. The equally good resulting dyeings and prints have fastness properties and are of orange, red, violet and blue tones. The following tabulation identifies these additional dyestuffs.

| D | Y | X | R¹ | R³ | R² |
|---|---|---|---|---|---|
| 2-Cyan-4-nitrophenyl | —CH₃ | —H | —H | —C₂H₅ | —H |
| 2,4-Dinitrophenyl | " | " | " | " | " |
| 2,4-Dinitro-6-chlorphenyl | " | " | " | " | " |
| O₂N—⟨⟩—N=N—⟨⟩(Cl)— | " | " | " | " | " |
| 2-Chlor-4-nitrophenyl | " | " | —CH₃ | " | " |
| 2-Cyan-4-nitrophenyl | " | " | " | " | " |
| 2,4-Dinitro-6-chlorphenyl | " | " | " | " | " |
| 5-(β-Hydroxypropyl)-1,2,4-triazolyl-(3) | " | " | " | " | " |
| 2-Cyan-4-nitrophenyl | " | —OCH₃ | —H | " | " |
| 2,4-Dinitro-6-chlorphenyl | " | " | " | " | " |
| 2,4-Dinitro-6-bromphenyl | " | " | " | " | " |
| 2-Cyan-4-nitro-6-bromphenyl | " | " | " | " | " |
| 5-Nitro-thiazolyl-(2) | " | " | " | " | " |
| 2,4-Dinitro-6-chlorphenyl | " | " | " | —C₄H₉(n) | " |
| 2,4-Dinitro-6-brom-phenyl | " | " | " | " | " |
| 2-Cyan-4-nitro-6-bromphenyl | " | " | " | " | " |
| 2-Cyan-4-nitrophenyl | " | " | " | —C₂H₄OCH₃ | " |
| 2,4-Dinitro-6-chlorphenyl | " | " | " | " | " |
| 2,4-Dinitro-6-bromphenyl | " | " | " | " | " |
| 2-Cyan-4-nitro-6-bromphenyl | " | " | " | " | " |
| 2,4-Dinitro-6-chlorphenyl | " | —OC₂H₅ | " | —C₂H₅ | " |
| " | " | " | " | —C₄H₉(iso) | " |
| " | " | " | " | —C₂H₄OC₂H₄OC₂H₅ | " |
| " | —C₃H₇(n) | " | " | —C₂H₅ | " |
| " | —CH₃ | " | " | —C₂H₄OCH₃ | " |
| 2-Cyan-4-nitro-6-bromphenyl | " | " | " | —C₂H₅ | " |
| " | " | " | " | —C₄H₉(n) | " |

-continued

| D | Y | X | R¹ | R³ | R² |
|---|---|---|---|---|---|
| " | " | " | " | —C₂H₄OCH₃ | " |
| " | " | " | " | —C₂H₄OC₂H₄OC₂H₅ | " |
| 5-Nitro-thiazolyl-(2) | " | " | " | —C₂H₄OCH₃ | " |
| Benzthiazolyl-(2) | —C₃H₇(n) | " | " | —C₂H₅ | " |
| 2,4-Dinitro-6-bromphenyl | " | " | " | " | " |
| " | —CH₃ | " | " | " | " |
| 2-Cyan-4-nitro-6-bromphenyl | —CH₂CH₂CH₂OH | —O₂H₅ | " | " | " |
| 2,4-Dinitro-6-chlorphenyl | —CH₂OCH₃ | " | " | " | " |
| 2-Cyan-4-nitro-6-bromphenyl | " | " | " | " | " |
| 2,4-Dinitro-6-chlor-phenyl | NH—CH₂—CH=CH₂ | " | " | " | " |
| 4-Nitrophenyl | —H | —OCH₂CH₂OH | —CH₃ | —CH₃ | —CH₃ |
| 2-Methyl-4-nitro-phenyl | C₂H₅ | —OC₂H₄OC₂H₄OCH₃ | —H | —C₂H₄OC₂H₅ | —H |
| 2-Brom-4-nitro-phenyl | —CH₃ | —H | —C₂H₅ | —C₃H₇(n) | —C₂H₅ |
| 4-Cyanphenyl | —CH₂—O—C₄H₉(n) | —OC₂H₅ | —H | —C₅H₁₁(iso) | —H |
| 2-Nitro-4-chlor-phenyl | —CH₂Cl | —H | " | —C₂H₅ | " |
| 4-Nitro-2-bromo-6-methoxyphenyl | —CH₃ | " | " | " | " |
| 4-Nitro-2-cyan-6-athoxyphenyl | " | —OC₂H₄OC₆H₅ | " | " | " |
| 4-Methylsulfonylphenyl | —CH₂OC₆H₅ | —H | " | —CH₂CH₂Cl | " |
| 4-Nitro-2,6-dichlor-phenyl | —CH₂O——Cl | —O—n-C₃H₇ | " | —C₂H₅ | " |
| 4-n.Butylsulfonylphenyl | —CH₃ | —H | " | —CH₂CH₂OC₆H₅ | " |
| 4-Nitro-2,6-dibrom-phenyl | —CH₂CH₂OH | —OC₂H₅ | " | —C₂H₅ | " |
| 4-Nitro-2,6-dicyan-phenyl | —CH₃ | —OCH₃ | " | —C₂H₅ | " |
| 4-Nitro-2-cyan-6-methylsulfonyl-phenyl | " | " | " | " | " |
| 4-Nitro-2-methyl-sulfonyl-6-brom-phenyl | " | —H | " | " | " |
| 4-Methyl-5-nitro-thiazolyl-(2) | —CH₂CH₂OCH₃ | —O—C₄H₉(n) | " | " | " |
| 6-Nitro-benz-thiazolyl-(2) | —CH₃ | —OC₂H₅ | " | —C₂H₄OCH₃ | " |
| 5-Nitro-2,1-benz-isothiazolyl-(3) | " | " | " | " | " |
| 5-Nitro-7-brom-2,1-benzisothiazolyl-(3) | " | " | " | " | " |
| 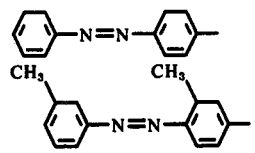 | " | —H | " | —C₂H₅ | " |
| 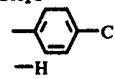 | " | " | " | " | " |
| 2-Nitro-4-brom-phenyl | —CH₂C₆H₅ | " | " | " | " |
| 2-Chlor-4-nitro-phenyl | —CH₃ | —OCH₂CH₂O——CH₃ | " | " | " |
| " | " | —H | " | —CH₂CH₂OCH₂CH₂OC₆H₅ | " |
| " | " | " | " | —CH₂CH₂C₆H₅ | " |
| " | —nC₅H₁₁ | " | " | —C₂H₅ | " |
| 2-Cyan-4-nitro-phenyl | —CH₂CH₂OC₆H₅ | " | " | " | " |
| " | —CH₂C₆H₅ | " | " | " | " |
| 2-Cyan-4-nitro-6-bromphenyl | —CH₂CH₂CH₂OH | —OC₂H₅ | " | " | " |
| 2-Cyan-4-nitro-6-brom-phenyl | —CH=CH₂ | " | " | " | " |
| 2-Chlor-4-nitrophenyl | —CH=CHC₆H₅ | —H | " | " | " |
| 2,4-Dinitro-6-chlor-phenyl |  | —OCH₃ | " | —CH₂CH₂OCH₃ | " |
| " | —OC₂H₅ | " | " | —C₂H₅ | " |
| 2-Cyan-4-nitrophenyl | —OC₆H₅ | —H | " | " | " |
| " | —O——OCH₃ | " | " | " | " |
| 2,4-Dinitro-6-chlor-phenyl | —NHC₂H₅ | —OC₂H₅ | " | " | " |
| 2-Cyan-4-nitro-6-bromphenyl | —NH—⟨H⟩ | " | " | " | " |

-continued

| D | Y | X | R¹ | R³ | R² |
|---|---|---|---|---|---|
| 2-Cyan-4-nitrophenyl | —NH—⟨phenyl⟩ | —H | " | " | " |
| 2-Cyan-4-nitro-6-bromphenyl | ⟨furyl⟩ | —OC₂H₅ | " | —C₂H₄OC₂H₄OCH₃ | " |
| " | ⟨thienyl⟩ | " | " | —C₂H₄OCH₃ | " |
| " | ⟨pyridyl⟩ | " | " | " | " |

EXAMPLE 4

There are dissolved 12.2 parts by weight of the dyestuff of the formula

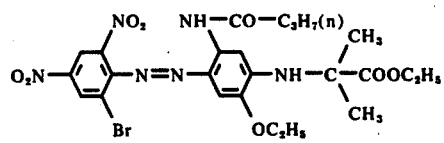

in 80 parts by weight dimethylformamide, 2 parts by weight copper-I-cyanide are then added and the mixture is heated to 85° while stirring for 8 hours.

The nucleophile exchange of the bromide in the diazo constituent by the cyano group may be easily demonstrated by thinlayer chromatography on silica gel plates.

Upon the completion of the reaction, the dyestuff is precipitated by the addition of water or methanol to the reaction mixture is isolated in a known manner.

The resulting dyestuff has the formula

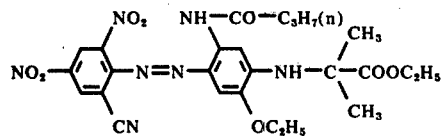

It dyes materials pure blue tones having very good coloristic properties.

If the dyestuff

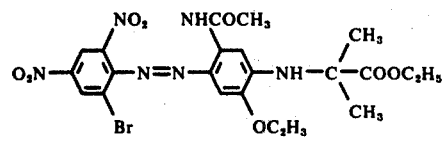

is reacted in the same manner with the nucleophilic reagents indicated in column I of the following table, there are obtained dyestuffs of column III, which also dye or print polyesters with blue tones. If dyestuff No. 4 of the table is oxidized at 20 to 30° with $H_2O_2$ in acetic acid or with peracetic acid, dyestuff No. 5 is obtained.

| No. | Nucleophilic Reagent | dyestuff |
|---|---|---|
| 1. | CuCN | $O_2N$—⟨NO₂, CN⟩—N=N—⟨NH—CO—CH₃, OC₂H₅⟩—NH—C(CH₃)(CH₃)—COOC₂H₅ |
| 2. | Zn(SO₂CH₃)₂ | $O_2N$—⟨NO₂, SO₂—CH₃⟩—N=N—⟨NH—CO—CH₃, OC₂H₅⟩—NH—C(CH₃)(CH₃)—COOC₂H₅ |
| 3. | NaNO₂/Cu | $O_2N$—⟨NO₂, NO₂⟩—N=N—⟨NH—CO—CH₃, OC₂H₅⟩—NH—C(CH₃)(CH₃)—COOC₂H₅ |
| 4. | CuSC₄H₉(n) | $O_2N$—⟨NO₂, SC₄H₉(n)⟩—N=N—⟨NH—CO—CH₃, OC₂H₅⟩—NH—C(CH₃)(CH₃)—COOC₂H₅ |

-continued

| No. | Nucleophilic Reagent | dyestuff |
|---|---|---|
| 5. | | 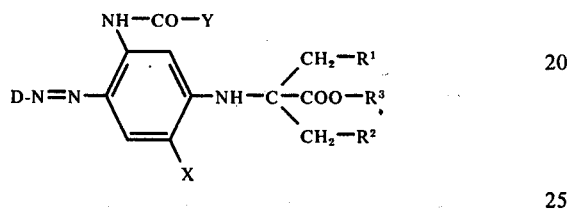 |

What is claimed is:
1. In the process of dyeing and printing synthetic hydrophobic fibers and films, the improvement which comprises employing a dyestuff of the formula

$$D-N=N-\underset{X}{\underset{|}{\bigcirc}}\underset{}{\overset{NH-CO-Y}{\overset{|}{-}}}NH-\underset{CH_2-R^2}{\overset{CH_2-R^1}{\underset{|}{C}}}-COO-R^3$$

wherein
D is phenyl, naphthyl, thiazolyl, benzothiazolyl, benzisothiazolyl or triazolyl or one of said radicals substituted with at least one member selected from the group consisting of alkyl having 1 to 4 carbon atoms, alkoxy having 1 to 4 carbon atoms, nitro, cyano, alkylsulfonyl having 1 to 4 carbon atoms, alkylthio having 1 to 4 carbon atoms, chlorine, bromine and phenylazo;
X is hydrogen, alkoxy having 1 to 6 carbon atoms or said alkoxy substituted with a member selected from the group consisting of hydroxy, alkoxy having 1 to 4 carbon atoms, phenoxy and alkyl substituted phenoxy having 1 to 4 carbon atoms in said alkyl moiety;
Y is hydrogen; alkyl having 1 to 5 carbon atoms; alkenyl having 2 to 5 carbon atoms; said alkyl or alkenyl substituted by halogen, hydroxy, alkoxy having 1 to 4 carbon atoms, phenoxy, alkyl substituted phenoxy having 1 to 4 carbon atoms in said alkyl moiety, phenyl or alkyl substituted phenyl having 1 to 4 carbon atoms in said alkyl moiety; cycloalkyl having from 3 to 8 carbon atoms; said cycloalkyl substituted with at least one member selected from the group consisting of halogen, cyano, alkyl having 1 to 3 carbon atoms and alkoxy having 1 to 3 carbon atoms; phenyl; phenyl substituted with at least one member selected from the group consisting of halogen, cyano, alkyl having 1 to 3 carbon atoms and alkoxy having 1 to 3 carbon atoms; pyridyl; thiazolyl; benzothiazolyl; imidazolyl; benzimidazolyl; thienyl; furyl; pyrrolyl; alkoxy having 1 to 6 carbon atoms; said alkoxy substituted with a member selected from the group consisting of hydroxy, alkoxy having 1 to 4 carbon atoms, phenoxy and alkyl substituted phenoxy wherein said alkyl moiety has from 1 to 4 carbon atoms; phenoxy; alkoxy substituted phenoxy having 1 to 4 carbon atoms in said alkoxy moiety or —NHR$^4$ wherein R$^4$ is alkyl having 1 to 6 carbon atoms; alkenyl having 2 to 6 carbon atoms; cycloalkyl having 3 to 8 carbon atoms; benzyl; phenethyl; phenyl or said cycloalkyl or phenyl substituted by at least one member selected from the group consisting of halogen, cyano, alkyl having 1 to 3 carbon atoms and alkoxy having 1 to 3 carbon atoms;
R$^1$ and R$^2$ are hydrogen or alkyl having 1 to 3 carbon atoms and
R$^3$ is alkyl having 1 to 5 carbon atoms or said alkyl substituted by a member selected from the group consisting of halogen, alkoxy having 1 to 2 carbon atoms, alkoxy substituted alkoxy wherein each alkoxy group has 1 to 2 carbon atoms, phenoxy, phenoxy substituted alkoxy having 1 to 2 carbon atoms in said alkoxy moiety and phenyl.

2. The process of claim 1 wherein
D is phenyl or phenyl substituted with at least one member selected from the group consisting of alkoxy having 1 to 2 carbon atoms, nitro, cyano, alkylsulfonyl having 1 to 4 carbon atoms, chlorine, bromine and phenylazo;
X is hydrogen, alkoxy having 1 to 6 carbon atoms or said alkoxy substituted with a member selected from the group consisting of hydroxy, alkoxy having 1 to 4 carbon atoms, phenoxy and alkyl substituted phenoxy having from 1 to 4 carbon atoms in said alkyl moiety;
Y is alkyl having 1 to 5 carbon atoms or said alkyl substituted by halogen, hydroxy, alkoxy having 1 to 4 carbon atoms, phenoxy, alkyl substituted phenoxy having 1 to 2 carbon atoms in said alkyl moiety, phenyl or alkyl substituted phenyl having 1 to 2 carbon atoms in said alkyl moiety; phenyl; phenyl substituted with at least one member selected from the group consisting of halogen, alkyl having 1 to 2 carbon atoms and alkoxy having 1 to 2 carbon atoms; pyridyl; furyl; alkoxy having 1 to 6 carbon atoms; said alkoxy substituted with a member selected from the group consisting of alkoxy having 1 to 2 carbon atoms; phenoxy; or —NHR$^4$ wherein R$^4$ is alkyl having 1 to 6 carbon atoms; alkenyl having 2 to 6 carbon atoms or phenyl;
R$^1$ and R$^2$ are hydrogen or alkyl having 1 to 3 carbon atoms and
R$^3$ is alkyl having 1–5 carbon atoms or said alkyl substituted by a member selected from the group consisting of halogen, alkoxy having 1 to 2 carbon atoms, alkoxy substituted alkoxy wherein each alkoxy group has 1 to 2 carbon atoms, phenoxy, phenoxy substituted alkoxy having 1 to 2 carbon atoms in said alkoxy moiety and phenyl.

3. The process of claim 1 wherein
D is selected from the group consisting of 2,4-dinitro-6-chlorophenyl, 2,4-dinitro-6-bromophenyl and 2-cyano-4-nitro-6-bromophenyl;
X is hydrogen, alkoxy having 1 to 6 carbon atoms or said alkoxy substituted with alkoxy having 1 to 4 carbon atoms;

Y is alkyl having 1 to 4 carbon atoms;

R$^1$ and R$^2$ are hydrogen or alkyl having 1 to 3 carbon atoms and

R$^3$ is alkyl having 1 to 5 carbon atoms or said alkyl substituted by a member selected from the group consisting of halogen, alkoxy having 1 to 2 carbon atoms and alkoxy substituted alkoxy wherein each alkoxy group has 1 to 2 carbon atoms.

4. The process of claim 1 wherein

D is selected from the group consisting of 2,4-dinitro-6-chlorophenyl, 2,4-dinitro-6-bromophenyl and 2-cyano-4-nitro-6-bromophenyl;

X is hydrogen, methoxy or ethoxy;

Y is methyl;

R$^1$ and R$^2$ are hydrogen and

R$^3$ is ethyl, n-butyl, sec.-butyl, isobutyl, 2-methoxyethyl, 2-ethoxyethyl, 2-(2'-methoxyethoxy)-ethyl or 2-(2'-ethoxyethoxy)-ethyl.

5. The process of claim 1 wherein said dyestuff is of the formula

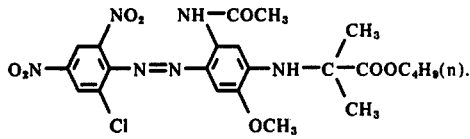

6. The process of claim 1 wherein said dyestuff is of the formula

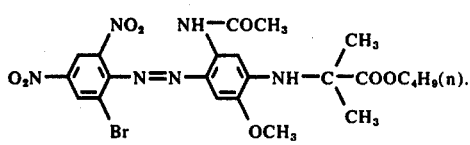

7. The process of claim 1 wherein said dyestuff is of the formula

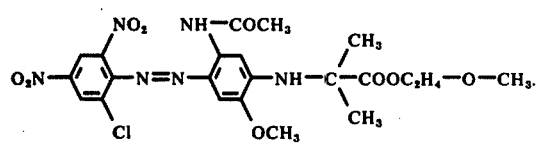

* * * * *